(12) United States Patent
Model et al.

(10) Patent No.: US 10,838,185 B2
(45) Date of Patent: Nov. 17, 2020

(54) MICROSCOPIC SYSTEMS AND METHODS FOR OBSERVATION OF LIVING CELLS AND ORGANISMS

(71) Applicants: Kent State University, Kent, OH (US); Michael Model, Chagrin Falls, OH (US); Anatoly Khitrin, Kent, OH (US)

(72) Inventors: Michael Model, Chagrin Falls, OH (US); Anatoly Khitrin, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 16/309,347

(22) PCT Filed: Jun. 20, 2017

(86) PCT No.: PCT/US2017/038249
§ 371 (c)(1),
(2) Date: Dec. 12, 2018

(87) PCT Pub. No.: WO2017/223036
PCT Pub. Date: Dec. 28, 2017

(65) Prior Publication Data
US 2019/0310453 A1      Oct. 10, 2019

Related U.S. Application Data

(60) Provisional application No. 62/353,643, filed on Jun. 23, 2016.

(51) Int. Cl.
*G02B 21/06*         (2006.01)
*G02B 21/00*         (2006.01)
(Continued)

(52) U.S. Cl.
CPC ............. *G02B 21/06* (2013.01); *G02B 21/00* (2013.01); *G02B 21/24* (2013.01); *G02B 21/34* (2013.01)

(58) Field of Classification Search
CPC ........ G02B 21/06; G02B 13/00; G02B 21/24; G02B 21/18; G02B 21/20; G02B 21/22;
(Continued)

(56) References Cited

U.S. PATENT DOCUMENTS 4,900,934 A * 2/1990 Peeters .............. G01N 21/6458
250/461.1
5,687,251 A * 11/1997 Erler ..................... G06T 7/0012
382/133

(Continued)

OTHER PUBLICATIONS

Model et al., 3D Deconvolution of Spherically Aberrated Images Using Commercial Software, Journal of Microscopy, vol. 241, Pt. 1 2011, 2010 (Retrieved Aug. 7, 2017). Retrieved from internet:http://onlinelibrary.wiley.com/doi/10.1111/), 1365-2818.2010.03416.x/pdf pp. 94-100, U.S.A.

(Continued)

*Primary Examiner* — Dawayne Pinkney
(74) *Attorney, Agent, or Firm* — Hahn Loeser + Parks LLP; Scott M. Oldham, Esq.

(57) ABSTRACT

The invention relates to systems and methods for observing materials, such as living cells or organisms, wherein the systems and methods utilize a microscopy system having an illumination source and an objective lens. A specimen including a predetermined amount of a liquid medium and a predetermined amount of an extracellular strongly absorbing dye is positioned for observation using the microscopy system. The illumination of the specimen correlates to the spectral region around the peak of the dye absorbance for the dye used in the system, such that live cells and organisms appear in contrast over a dark background for observation.

20 Claims, 5 Drawing Sheets

(51) Int. Cl.
*G01N 21/01* (2006.01)
*A61B 3/14* (2006.01)
*A61B 3/10* (2006.01)
*G02B 21/24* (2006.01)
*G02B 21/34* (2006.01)

(58) Field of Classification Search
CPC .... G02B 21/082; G02B 21/34; G02B 27/144; G02B 27/126; G02B 27/145; G02B 5/045; G02B 27/143; G02B 27/0025; G02B 27/1013; G02B 21/248; A61B 3/1225; A61B 3/103; A61B 3/113; A61B 3/152; A61B 3/14; A61B 3/1208
USPC ....... 359/385, 362, 368, 374–376, 389, 398, 359/629, 640, 381, 618, 625, 636–639, 359/372; 351/221, 200, 210, 205, 208, 351/206, 213
See application file for complete search history.

(56) References Cited

U.S. PATENT DOCUMENTS

| | | |
|---|---|---|
| 5,784,162 A | 7/1998 | Cabib |
| 6,650,357 B1 | 11/2003 | Richardson |
| 7,718,423 B2 | 5/2010 | Tsuchiya |
| 2005/0043193 A1* | 2/2005 | Pham .................. A61K 8/19 510/130 |

OTHER PUBLICATIONS

United States Patent and Trademark Office, International Search Report/Written Opinion, International Application No. PCT/US17/038249, dated Aug. 30, 2017, 20 pages, Alexandria, VA U.S.A.

* cited by examiner

FIG. 2
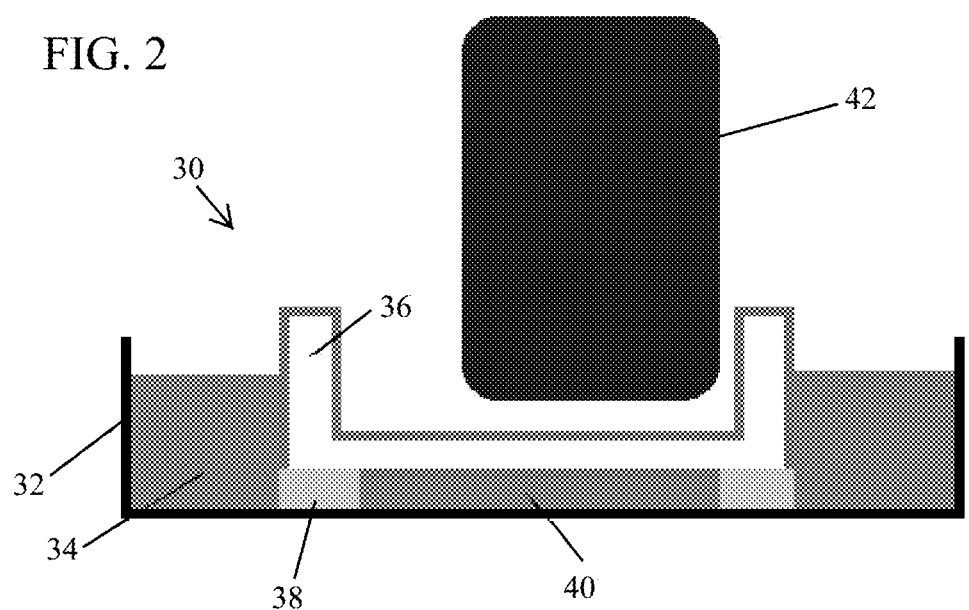
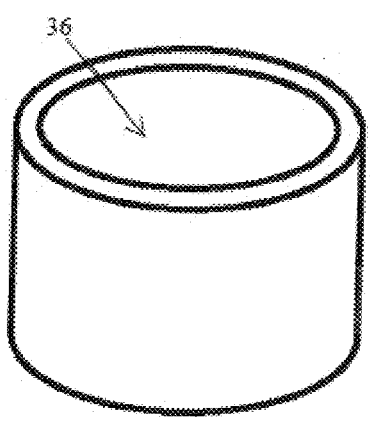
FIG. 3
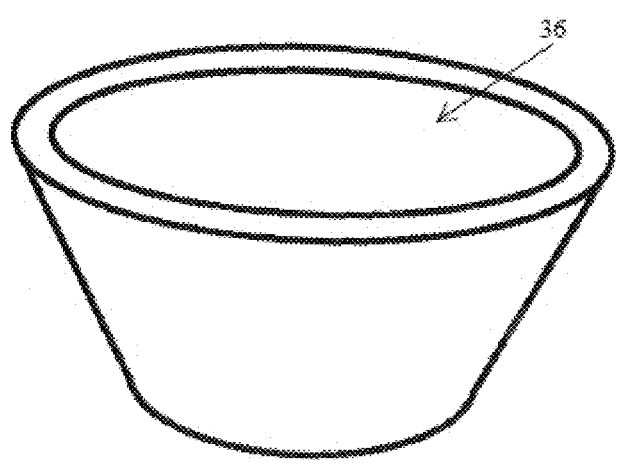
FIG. 4

FIG. 6a  FIG. 6b  FIG. 6c
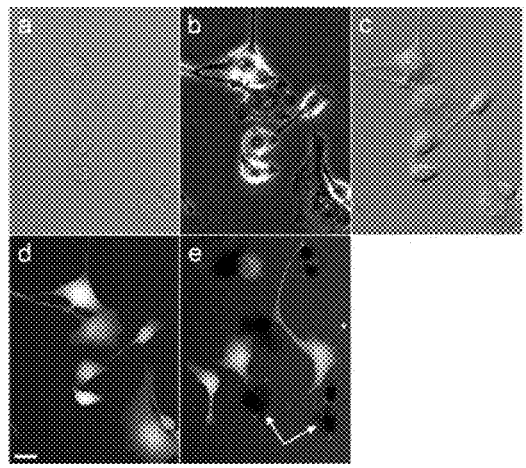
FIG. 6d  FIG. 6e
FIG. 7a  FIG. 7b
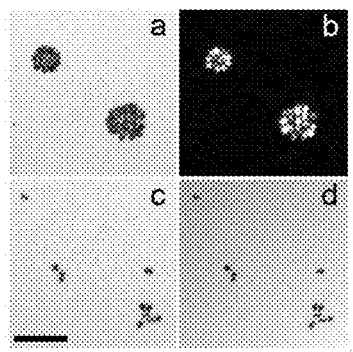
FIG. 7c  FIG. 7d FIG. 8a  FIG. 8b  FIG. 8c
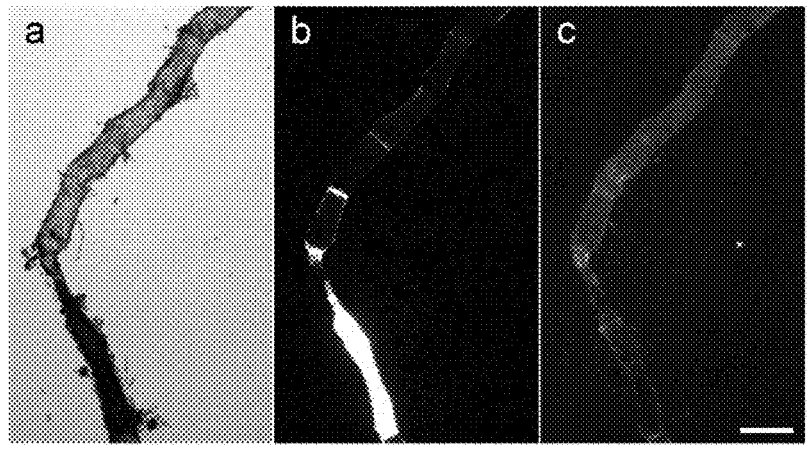
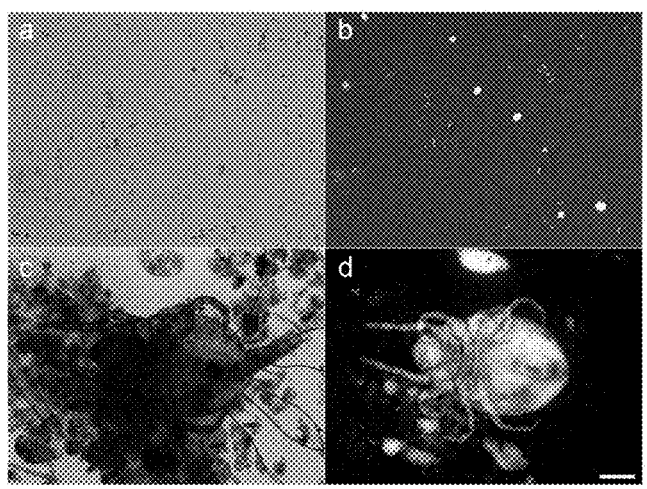
FIG. 9a  FIG. 9b
FIG. 9c  FIG. 9d

MICROSCOPIC SYSTEMS AND METHODS FOR OBSERVATION OF LIVING CELLS AND ORGANISMS

CROSS REFERENCE TO RELATED APPLICATIONS

This application is a national phase application of PCT International Application No. PCT/US17/38249, filed Jun. 20, 2017, which claims priority to and the benefit of U.S. Provisional Patent Application Ser. No. 62/353,643, filed on Jun. 23, 2016, and is incorporated herein by reference in its entirety.

TECHNICAL FIELD

The present invention relates to a system and methods for observation of living cells or organisms in environmental or other samples by generating contrast in the living cells or organisms.

BACKGROUND OF THE INVENTION

Microscopic observation of living cells and organisms, particularly in environmental samples, can be hampered by their low visibility in the presence of contaminating matter. Attempts to overcome this problem have relied upon staining of the living cells and organisms, such as by fluorescent nucleic acid probes. Though this may help observation of living cells and organisms, other problems such as autofluorescence and nonspecific binding in such samples are quite common. More advanced methods have been proposed to discriminate between specific staining and autofluorescence, but those require custom setup and are thus expensive. Furthermore, accessibility to vital stains varies between different cell types. It would therefore be worthwhile to provide a microscopy system and methods that more simply generate contrast of the living cells or organisms, to facilitate observation of the living cells or organisms.

SUMMARY OF THE INVENTION

The present invention provides a microscopy system and methods for observation of living cells or organisms in environmental or other samples. In an example, the system and methods render live cells or organisms bright red over a dark background for example. The system and methods allow observation of living cells and organisms in environmental samples, or any other suitable sample, such as cultured cells or the like. Environmental samples often contain large amounts of detritus that can easily obscure living cells and organisms. The present invention avoids issues in observing living cells or organisms, as the cells with intact membrane turn bright, while the dead matter remains dark.

In one example, the invention relates to a system for observing living cells or organisms comprising a microscopy system having a source of illumination and an objective lens. The system also includes a specimen comprising a sample containing living cells or organisms and a predetermined amount of at least one extracellular dye. The source of illumination produces light with a spectral region around the peak of the dye absorbance for the at least one dye, that is directed through the specimen to the objective lens. The specimen is viewable with the microscopy system.

In another example, the invention relates to a method of observing living cells and organisms in a specimen. The method includes providing a microscopy system having a source of illumination and an objective lens. The specimen includes a predetermined amount of a sample having living cells or organisms, which is mixed with a predetermined amount of at least one dye. An amount of the specimen is positioned in association with the microscopy system, and the source of illumination produces light with a spectral region around the peak of the dye absorbance for the dye, that is directed through the specimen to the objective lens. The specimen is viewable with the microscopy system.

Other aspects of the invention will become apparent upon reading the following description in conjunction with the figures.

BRIEF DESCRIPTION OF THE DRAWINGS

These and other features and advantages of the present invention will become better understood with regard to the following description, appended claims and accompanying drawings wherein:

FIG. 2 shows a containment system usable in association with the microscopy system.

FIGS. 3 and 4 show alternative cap or containment members of the containment system of FIG. 2.

FIGS. 6a-6e are images of MDBK cells imaged at a 20× magnification by four different techniques: (a) bright field; (b) phase contrast; (c) differential interference contrast; and (d) and (e) are images produced by the system and method of the invention.

FIGS. 7a-7d are images of a sample of pond water showing the non-filamentous green algae *Coelatrum* sp. imaged with a 4× objective. Images (a) and (b) show the original intact sample in (a) bright field and (b) the system and method of the invention, and images after the sample was exposed to 100° C. for 4 minutes, in (c) bright field and (d) the system and method of the invention.

FIGS. 8a-8c are images of a filamentous alga (Division Chlorophyta) at a 4× magnification, showing (a) bright field, (b) the system and method of the invention, and (c) Hoechst fluorescence.

FIGS. 9a-9d are images of an environmental water sample collected with a 10× objective, showing (a) bright field, (b) the system and method of the invention, (c) bright field and (d) the system and method of the invention.

DETAILED DESCRIPTION OF THE INVENTION

Figure 1:
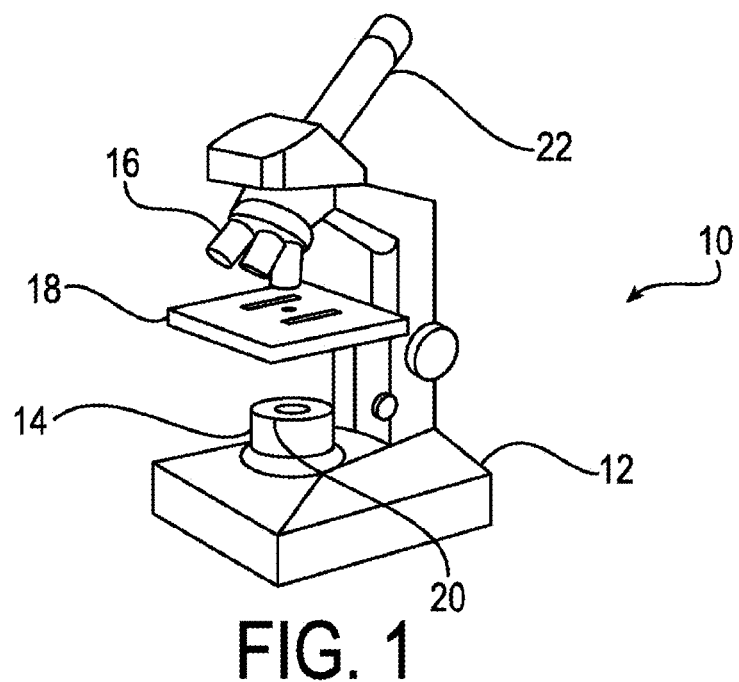
FIG. 1 is an example of a microscopy system according to the invention.

The present invention is described in detail with reference to examples and to the figures. A system 10 for observing living organisms in environmental specimens is shown in FIG. 1, comprising a microscope 12, having a source of illumination generally indicated at 14. In this example, the microscope 12 may be an upright microscope or an inverted microscope. In general, with inverted microscopes. samples are viewed from below since the optics are placed under the sample, and with upright microscopes samples are viewed from above with the optics positioned above the sample. The illumination source 14 in an example may be a white light, such as from a tungsten-halogen lamp, or may be a monochromatic light source. The microscope 12 may have a condenser lens (not shown) that serves to concentrate light from the illumination source 14 on a specimen including a sample in which living cells or organisms may be present, and is magnified by the objective lens 16. The specimen may be placed on a specimen slide, such as in association with a containment system or the like, and positioned on stage 18. If a white light source is used, an optical filter 20, such as band-pass filter is integrated into microscope 12, or retrofitted, as will be further described. The bandpass filter is placed anywhere between the light source 14 and observation point. Though the example of FIG. 1 shows an upright microscope 12, an inverted microscope or other suitable microscopy arrangement may be used. The filter 20 may have characteristics to pass light correlating to the spectral region around the peak of the dye absorbance for a dye used in the system, as will be further described below. The optical filter 20 may be tunable, such that the central wavelength can be chosen by the user, to pass light correlating to the spectral region around the peak of the dye absorbance for a dye used in the system. In this example, filtered light is then directed to the objective lens in eyepiece(s) 22 of the microscope 12, or in association with an image capture, projection or display device (not shown), for observation. If a monochromatic light source 14 which produces light correlating to the spectral region around the peak of the dye absorbance for a dye used in the system is provided, there may be no need for the optical filter 20. In an example, the source of illumination 14 may include both white and monochromatic sources, which can be independently selected for use. In such an example, a further switch for the monochromatic source may be provided.

The system 10 uses an imaging technique that presents living cells in a sample in strong contrast without the need to stain cells, particularly in environmental specimens where significant contaminants are also present. The system may be used itself for observation of environmental specimens, or as a supplement to other methods employed in observation of environmental specimens. Other specimens including living cells or organisms may also be observed. In environmental samples, microscopic observation of living cells and organisms is hampered by low visibility of living cells and organisms in the presence of contaminating matter, but the system and methods alleviate the masking by contaminating matter, by causing the living cells and organisms to appear in strong contrast to any contaminating matter.

Figure 5:
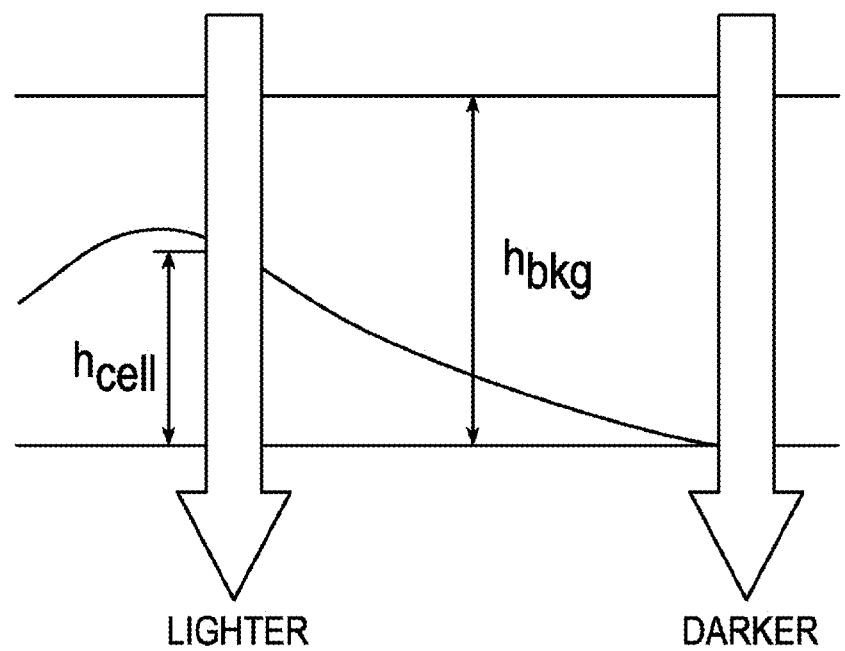
FIG. 5 is a schematic diagram showing absorption of transmitted light depending on the travel distance through a dye, $h_{bkg}$–$h_{cell}$, which is the smallest above a living cell.

In an example, the system 10 provides the strong contrast between living cells and organisms based on exclusion of the dye Acid Blue 9 (AB9) by living cells. Such a dye is also found to be generally non-toxic to living cells or organisms in small quantities. In an example method, a specimen is produced from 0.5-1.0%, and preferably around 0.7% of AB9, added to an original sample. If other dyes are used, the concentration used in the specimen may vary depending on the dye used. Other amounts of AB9 may be used depending on the particular application. Other suitable dyes may also be used, such dyes being non-toxic to living cells or organisms while being excluded by such living cells or organisms. For example, other suitable dyes may be Patent Blue V or other Acid Blue dyes. Other color dyes may also be suitable. The specimen may then be placed in association with transparent containment system, or in another suitable manner to allow viewing of the sample by the microscopy system 12 as desired. For example, FIG. 2 shows a containment system 30 that may include a transparent dish or the like 32 and a cap or containment member 36, positioned in the dish 32. A spacer 38, is provided on the bottom of the cap 36, and is of a predetermined dimension, such as ~30 μm for example. The spacer 38 creates a gap between the transparent bottom of the cap 36 over the dish bottom of ~30 μm. Cells that are to be imaged are either attached to the bottom of the dish or get into the gap in the liquid 34. In the case of upright microscope, the cap must be wide enough to accommodate the bulky objective 42, as the objective 42 has to be brought close enough to the cap bottom for imaging. In this example, the containment system 30 may be cylindrical as shown in FIG. 3, or of any other suitable shape. There is no such requirement for an inverted microscope. With an inverted microscope, it may be beneficial to have slanted cap walls as shown in FIG. 4, so as to not obstruct the light cone coming from the condenser above the dish 32. The dish 32 is provided with the liquid and at least one dye 34. Alternatively, the specimen may be provided in the space between a coverslip and a slide positioned on the stage 18, or in another suitable manner. The sample is imaged on microscope 12 in transmitted light from light source 14 at the wavelength of maximal absorption of AB9 (630 nm). This produces a dark background due to absorption of light by the dye. At the same time, living cells and organisms with intact cell membranes exclude the dye, and that reduces the depth of the absorbing layer through which light has to pass. Therefore, living cells and organisms appear brighter than the background in direct relationship to their thickness, as shown in FIG. 5 for example. Detritus and cells with broken membranes do not exclude AB9 and do not stand out over the background. The absorption of transmitted light depends on the travel distance through the dye, $h_{bkg}-h_{cell}$, which is the smallest above the cell. Thus, cells appear brighter than the background.

In an example of the method of the invention, at least one sample of a specimen in which living cells and organisms are to be observed is provided. An amount of a predetermined dye is mixed with the sample to produce a specimen. An amount of the sample is then placed on a slide or other transparent support or suitable medium for conducting observation using a microscope. The slide is positioned on the stage of the microscope and the sample is illuminated by the illumination source of the microscope. If the illumination source is white light, it is passed through a bandpass filter to produce light that correlates to the spectral region around the peak of the dye absorbance for the dye used in the system. Alternatively, a monochromatic light source that produces light that correlates to the spectral region around the peak of the dye absorbance for the dye used in the system may be used. The living cells and organisms are then observed or imaged with the microscope.

In a more particular example, a plurality of samples of water were collected from various aquatic environments. Approximately 10 ml of each sample of water were allowed to stand for a period of time, such as 10 minutes, to allow living organisms to sediment to the bottom of a collection tube, though this is not required. The sediment was collected in a small volume. Optionally, a nucleic acid stain, such as 10 μg/ml Hoechst 33258 (Sigma-Aldrich, St. Louis, Mo.) may be applied to stain nuclei. For imaging according to the invention, a 1.5% solution of AB9 (TCI America, Portland, Oreg.) in phosphate buffered saline was mixed with the sample in a 1:1 ratio to produce a specimen. A droplet containing ~30 μl of the specimen was placed on a slide and covered with a coverslip, and the specimen was viewable via the objective lens of the microscope.

In another example, Madin-Darby canine kidney (MDCK) cells (ATCC, Manassas, Va.) were grown on coverslips in DMEM with 10% fetal bovine serum; the medium was replaced before observation with Leibovitz's L-15 medium (Sigma-Aldrich) containing about 0.7% AB9. The slides were imaged on an Olympus inverted microscope IX81 under Köhler illumination using 20/0.7, 10/0.4 or 4/0.16 PlanApo objectives and a NA0.55 condenser. In an example, to obtain images according to the invention, light from a halogen lamp was passed through a 630/10 bandpass filter (Andover, Salem, N.H.) installed in a condenser wheel of a microscope. Other suitable integration or retrofitting of the bandpass filter into the microscopy system 10 may be used, with the filter positionable at any location between the light source and observation point. Control bright field images were observed through a 485/10 filter (Omega Optical, Brattleboro, Vt.), where AB9 does not absorb. Images were captured with a SensiCam QE CCD camera (Cooke, Romulus, Mich.). Phase contrast and DIC images were obtained in white light; fluorescence of Hoechst was recorded by illuminating the sample with a mercury arc lamp.

In the examples of FIGS. 6a-6e, the MDCK cells were imaged at a 20× magnification by four different transmission techniques: (a) bright field; (b) phase contrast; (c) differential interference contrast; (d) image acquired by the system and method of the invention. The other image (e) acquired by the system and method of the invention shows another field containing several dead cells (arrows). In intact cells, the images acquired by the system and method of the invention reflects cell thickness, with brighter areas corresponding to thicker parts of cells (FIG. 6d). The standard transmission methods, such as bright field, DIC or phase contrast, do not directly reveal the same information, such as shown in FIGS. 6a-6c. Cells with broken membranes absorb the dye and become either indistinguishable or darker than the background as shown in FIG. 6e. Cells identified as dead by images acquired by the system and method of the invention also show positive staining by the standard live-dead fluorescent probe propidium iodide (not shown). In FIGS. 6d-6e, the images acquired by the system and method of the invention are shown on a logarithmic intensity scale because cell thickness is proportional to the logarithm of cell brightness and also because the logarithmic scale better corresponds to human vision. The length of the scale bar is 25 μm.

Selective exclusion of AB9 by intact membranes is not limited to mammalian cells, but is also observed in cells from other kingdoms. For example, FIG. 7 shows a sample of pond water showing the non-filamentous green algae *Coelatrum* sp. imaged with a 4× objective. FIGS. 7a and 7b show the original intact sample in (a) bright field and (b) image acquired by the system and method of the invention. Next, the sample was exposed to 100° C. for 4 minutes, and (c) bright field and (d) image acquired by the system and method of the invention, were taken again. No cells in the heat-treated sample retained positive contrast. The length of the scale bar is 100 μm. This demonstrates that intact algae show positive contrast in images acquired by the system and method of the invention, but that is eliminated by briefly placing the test tube in boiling water which destroyed the cells, or by otherwise destroying the cells.

The filamentous algae *Microspora* sp. is imaged using the method and is shown in FIG. 8. A bright field image is shown in FIG. 8a, while FIG. 8b is an image acquired by the system and method of the invention, and FIG. 8c a Hoechst fluorescence image, each at a 4× magnification. The scale bar is 200 μm. The algae consists of two sections, one of which appears much darker than the other on the bright field image of FIG. 8a. This information can be difficult to interpret; however, the corresponding image acquired by the system and method of the invention of FIG. 8b clearly shows that the darker section excludes the dye and is apparently intact, whereas the more transparent part is leaky and absorbed the dye. Hoechst staining of both parts was weak and apparently not very specific.

In another example, the use of the dye and predetermined illumination provide the strong contrast generated by dye-excluding living cells to enable one to discern the living cells and organisms in samples contaminated with dead matter and debris. FIG. 9 shows a comparison of bright field images of such a sample in FIGS. 9a and 9c to images according to the method of the invention in FIGS. 9b and 9d. These images are of a water sample collected and imaged with a 10× objective. The first two images of FIGS. 9a and 9b show a few live algal and possibly other cells, along with numerous floating fragments. The cells that are most prominent on the image acquired by the system and method of the invention of FIG. 9b are barely visible in the bright field image of FIG. 9a. Images 9c and 9d show a Hydracarina aquatic mite, which is a scavenger of debris common in freshwater ecosystems. A large part of the insect is hidden behind debris when observed in bright field as shown in FIG. 9c, but the image acquired by the system and method of the invention shows the entire body in clear detail. The scale bar is 100 μm.

Figure 10A:
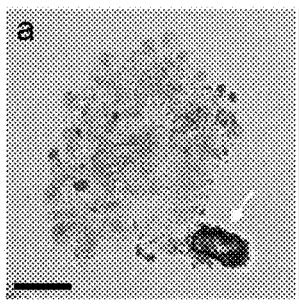
FIGS. 10a-10c are images of an environmental water sample collected with a 20× objective, showing (a) bright field, (b) Hoechst fluorescence, and (c) the system and method of the invention.
Figure 10B:
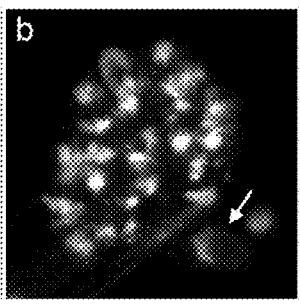
Figure 10C:
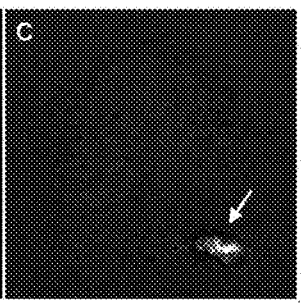

The presented images demonstrate the ability of the system and method of the invention to reveal living cells and organisms, including algae and microorganisms. False positives may result from small transparent particles, such as sand. Those can be recognized by extremely strong contrast in bright field, due to their high refractive index, and the lack of DNA staining, such as shown in FIG. 10. The example of FIG. 10 shows images of a sample from a freshwater natural area imaged with a 20× objective. FIG. 10a shows a bright field image in FIG. 10a, a Hoechst fluorescence image in FIG. 10b, and an image acquired by the system and method of the invention in FIG. 10c. Even though the object indicated by the arrow is brighter in the image acquired by the system and method of the invention, it does not appear to be a live cell, as evidenced by its strong bright field contrast (suggesting a large refractive index difference between this object and the medium) and the lack of specific DNA staining. The length of the scale bar is 25 μm. the method of the invention may therefore be used in conjunction with other techniques to facilitate observation of living cells and organisms.

The examples clearly show that the system and method of the invention are highly effective at enabling the observation and recognition of living cells and organisms in environmental or other samples, even those heavily contaminated with dead matter and detritus. The concentration of dye, such as AB9, is chosen such as to ensure sufficient contrast (which typically requires at least about 0.5% AB9) while not making the sample too dark. The latter depends not only on the dye concentration but also on the depth of the specimen or containment system in which the specimen is positioned. In the above examples, this depth relates to the gap between the cover glass and a slide, and on the brightness of illumination.

In general, when using AB9, a depth of specimen of about 20-40 μm has been found to be effective, but other depths may be more suitable for other dyes or in relation to particular characteristics of a sample used in the specimen.

In a further example, the depth of specimen may be controlled by providing an adjustable depth containment system in which the specimen is provided. For example, using a slide and coverslip, a predetermined distance between the coverslip above the slide on which a sample is disposed may be obtained by allowing the distance to be adjusted. In an example, a small amount of compressible material, such as silicon grease, may be used to keep the coverslip above the slide at a distance that can then be adjusted by applying pressure between the coverslip and slide, to achieve the desired depth to allow observation of the living cells and organisms in the sample. Other structure to provide an adjustable depth containment system may be used. Alternatively, a fixed-depth containment system such as shown in FIG. 2 may be used, with different depths formed in association with the cap member 36, or other suitable system. A suitable containment system can be any structure with optical characteristics, but may also include fluid and/or temperature control capabilities. This may be a simple slide with coverslip or a more complex dedicated live-cell environmental system. In general, the arrangement of the specimen in conjunction with the microscope allows the specimen to be studied on a flat transparent surface compatible with imaging. The arrangement may also allow for a fluid containment structure for liquid media of a suitable volume to maintain the viability of living cells or organisms. Factors such as pH or temperature or other conditions may be controlled if desired. Suitable optical enclosures may include open or closed systems. In another alternative, the depth of specimen may be controlled by immersion of an appropriate objective lens 16 into the specimen directly for an upright microscope. For example, the specimen may be provided in a Petri dish, which is positioned on the stage 18, and the objective lens 16 (or housing around the lens) is moved into the specimen until the desired depth is achieved which provides contrast illumination between the living cells or organisms and the remainder of the specimen. As another alternative, the position of an immersible light source could be adjusted to vary the depth of the specimen that light is directed through.

Contrast in images provided by the system and methods of the invention depend on the cell thickness, and a cell with thickness h (microns) is brighter than the background by the factor $e^{0.22 \cdot c \cdot h}$, where c is the dye concentration (such as of AB9) in % w/v. The system and methods of the invention can also be combined with bright field imaging by switching from red to blue light (which AB9 does not absorb) for example, or other suitable illumination sources, and is compatible with fluorescence. The predetermined illumination may be provided by an illumination source 14 directed through a bandpass filter placed anywhere between a white light source (such as halogen lamp) and an eyepiece, projector or a camera for example. The illumination source 14 could also be LEDs or other suitable source, or a monochromatic light source as will be described. In the examples using the dye AB9, having a peak absorbance at about 630 nm, a desired illuminating light is provided at the spectral region around the peak of the dye absorbance for the dye used in the system, at about 630 nm, which can be delivered to the specimen using an appropriate bandpass filter. Due to its simplicity and low cost, the method can be realized on any microscope. The microscope may include an integrated illumination source and bandpass filter to provide the desired illumination, or can be retrofitted to allow the bandpass filter to be positioned between a light source including and an eyepiece, projector or a camera for example. Alternatively, a light source providing substantially monochromatic illumination at a predetermined wavelength or narrow range of wavelengths about a desired wavelength may be integrated into or retrofit with the microscope 12. For example, one or more LED's emitting monochromatic light at about 630 nm may be provided if the AB9 dye is used.

The invention has been described with reference to examples and confirmed by images of observed samples/specimens presented above. Only examples have been presented and described in detail, it is to be understood that the invention is not limited thereto or thereby. It is therefore intended that the invention not be limited to the particular embodiments disclosed as examples of invention, but that the instant invention will include all embodiments falling within the scope of the appended claims.

What is claimed is:

1. A system for observing living cells or organisms comprising,
a microscopy system having a source of illumination, an objective lens, and a sample between the source of illumination and the objective lens wherein the light from the source of illumination is transmitted through the sample to the objective lens;
the sample having living cells or organisms and a predetermined amount of at least one extracellular dye, wherein the at least one extracellular dye absorbs light from the source of illumination and the predetermined spectral region of the source of illumination is around the peak of the dye absorbance for the at least one extracellular dye, wherein illumination by the source of illumination causes positive contrast of any living cells or organisms based on the absorption of light by the at least one extracellular dye in non-living materials in the sample in direct relationship to the thickness of the cells or organisms.

2. The system of claim 1, wherein the source of illumination is a white light source and further comprising a bandpass filter positioned between the white light source of illumination and a point of observation to produce the illumination around the peak of the dye absorbance for the at least one extracellular dye.

3. The system of claim 2, wherein the bandpass filter is tunable.

4. The system of claim 2, wherein the bandpass filter is retrofitted into the microscopy system.

5. The system of claim 1, wherein the source of illumination produces a monochromatic light with a spectral region around the peak of the dye absorbance for the at least one extracellular dye.

6. The system of claim 5, wherein the monochromatic light source is retrofitted into the microscopy system.

7. The system of claim 1, wherein the at least one extracellular dye has a peak absorbance of about 630 nm.

8. The system of claim 1, wherein the at least one extracellular dye is Acid Blue 9 (AB9).

9. The system of claim 1, wherein the sample is positioned in an adjustable or fixed depth containment system.

10. The system of claim 1, wherein the absorption of transmitted light by the sample depends on the travel distance through the at least one extracellular dye, the system further comprising an image acquisition system with images providing information on the thickness of the living cells or organisms.

11. The system of claim 10, wherein a cell with thickness h is brighter than the background by a predetermined factor based on the concentration of the at least one extracellular dye.

12. A method of observing living cells and organisms in a specimen comprising:
- providing a microscopy system having a source of illumination, an objective lens and a specimen between the source of illumination and the objective lens wherein the light from the source of illumination is transmitted through the specimen to the objective lens;
- the specimen having a sample mixed with a predetermined amount of at least one predetermined extracellular dye;
- positioning an amount of the specimen in association with the microscopy system, and operating the source of illumination to produce light with a spectral region around the peak of the dye absorbance for the at least one predetermined extracellular dye, that is directed through the specimen to the objective lens, wherein living cells or organisms turn bright based on the absorption of light by the at least one extracellular dye in non-living materials in the sample with the positive contrast of living cells or organisms in direct relationship to the thickness of the cells or organisms in the specimen.

13. The method of claim 12, wherein the sample is an environmental sample.

14. The method of claim 12, wherein the amount of the specimen is positioned in a containment system which controls the depth of the specimen.

15. The method of claim 12, wherein the at least one predetermined extracellular dye is a 0.3-1.0% solution of Acid Blue 9 (AB9).

16. The method of claim 12, wherein the source of illumination includes a bandpass filter tuned to correlate to the spectral region around the peak of the dye absorbance for the at least one extracellular dye used in the specimen.

17. The method of claim 12, wherein the source of illumination produces light with a spectral region around the peak of the dye absorbance for the at least one extracellular dye used in the specimen.

18. The method of claim 17, wherein the source of illumination to produce light with a spectral region around the peak of the dye absorbance for the at least one extracellular dye is provided by at least one monochromatic light source.

19. The method of claim 12, further comprising acquiring at least one image of the specimen wherein absorption of transmitted light by the specimen depends on the travel distance through the at least one extracellular dye, and at least one image provides information on the thickness of any living cells or organisms in the specimen.

20. An observing system comprising,
- a microscopy system having at least one source of illumination and an objective lens;
- a specimen comprising a predetermined amount of a liquid medium sample and a predetermined amount of at least one liquid extracellular dye, wherein the at least one source of illumination produces light with a spectral region around the peak of the dye absorbance for the at least one extracellular liquid dye, and the light is directed through the specimen to the objective lens for observing living materials, wherein the absorption of transmitted light by the specimen depends on the travel distance through the at least one extracellular dye, and any living cells or organisms appear brighter in the specimen in direct relationship to the thickness of any living cells or organisms in the specimen.

* * * * *